June 13, 1939. L. E. STIPE 2,162,363
ICE CUBE TRAY FOR REFRIGERATORS
Filed July 30, 1934
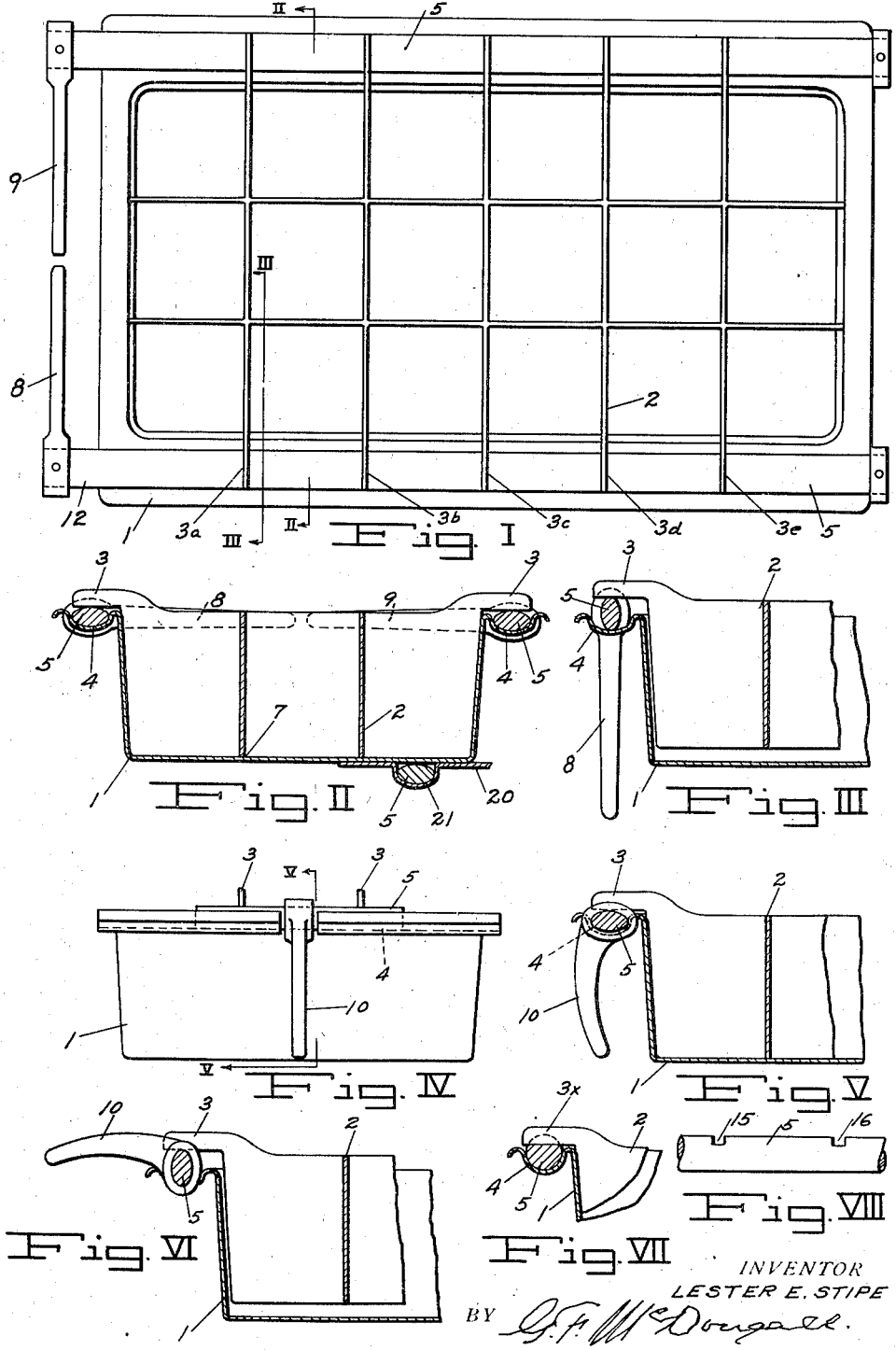
INVENTOR
LESTER E. STIPE
BY G. F. McDougall
ATTORNEY Patented June 13, 1939

2,162,363

UNITED STATES PATENT OFFICE 2,162,363

ICE CUBE TRAY FOR REFRIGERATORS

Lester E. Stipe, Portland, Oreg.

Application July 30, 1934, Serial No. 737,583

12 Claims. (Cl. 62—108.5)

My invention relates to ice cube trays of the particular type used in domestic refrigerators and wherein a tray is provided with a grid, not watertight with respect to the tray, for the purpose of defining division lines of the contents of the tray so that said contents will break into ice cubes when contained water is congealed.

So providing a tray with a grid is not new and is well known in the art and various devices have been proposed for breaking the contact of the ice cubes so delimited, with the grid, and with the walls of the tray itself.

It requires considerable force to break a frozen joint of this character and various devices involving cams and gears have been proposed, the disadvantages of which are manifest since they apply the lifting power at one end of the ice tray and between the tray and grid and require generally that the entire frozen surface be broken at once. I have determined that this is not the correct way to accomplish this function and that if the grids can be loosened at one corner, for example, by a first movement of a breaking device and then the breaking power can be progressively applied successively at different points along say one side, that less power will be required, less rigidity will be required of both the grid and the tray itself and incidentally a much less expensive apparatus can be the result.

Another object of my invention is a breaking device that may be easily lifted clear of the tray for washing and that requires no joints that are difficult to clean, nor bearings that require to be oiled in order to work freely, and that is powerful while having a minimum of parts.

These and other objects will be apparent from the specification and the accompanying drawing, in which,—

Fig. I is a plan view of an ice cube tray provided with a grid and equipped with a breaking device according to the preferred form of my invention;

Fig. II is a section of Fig. I on the line II—II of Fig. I;

Fig. III is a broken away section of Fig. I on the line III—III of Fig. I, showing the breaking device moved through a partial revolution to break the frozen connection between the grid and the tray;

Fig. IV is an end view of a tray equipped with another form of my invention wherein the breaking device is placed at one end of the tray instead of along one or both sides;

Fig. V is a section on the line V—V of Fig. IV;

Fig. VI is a view of Fig. V taken on the same section lines except that it shows the breaking device as having been operated to break the frozen connection between the grid and the tray;

Fig. VII is an end view showing an economical way of making the breaking device; and Fig. VIII is a projection of the breaking device as shown in Fig. VII.

In the drawing 1 represents a tray and 2 represents a grid which may have any convenient number of divisions longitudinally and crosswise to divide the interior of the tray into a convenient number of rectangular spaces. No special description is required of the manner of making the grid since these devices are well known, except that each grid is provided with an overhanging lug such as 3 which overhangs the edges of the tray and is preferably made a part of the crosswise divisional strips of the grid 2, when the invention is to be constructed as shown in Figs. I, II and III; or which are formed as a part of the longitudinal grid sections when the device is to be made as shown in Fig. IV, with the breaking device at one end of the tray.

The breaking device consists essentially of a pocket or groove 4, preferably formed in the edge or end of the tray as the case may be, within which is movably laid an elliptical rod or breaking device 5; the word "elliptical" here being used as generic to any rod having an irregular cross-section that will accomplish the purpose hereinafter set forth.

The elliptical rod 5 is light in weight and small in both its diameters and should preferably be made of one of the stainless varieties of steel and should be heat treated or rolled to have a temper that will permit it to be very considerably twisted without exceeding the elastic limit of the material. This type of rod will hereinafter be called a torsion rod.

The groove 4 should be so positioned that it will just contain the elliptical rod 5 and permit the lug such as 3 to lie smoothly on top of the said rod 5 when the bottom of the grid 2 rests firmly on the bottom of the tray 1 about as illustrated at numeral 7.

The contents of the tray are then frozen and the tray removed from the refrigerator, then to break the connection between the grid 2 and the tray 1, the elliptical rod 5 is moved through a partial revolution.

Means diagrammatically illustrated by the handles 8, 9, and 10 are shown as a convenient structure for accomplishing this function.

It will be observed if we consider that the tray shown in Fig. I is filled with ice cubes and for example the handle 8 is moved downwardly toward the position shown in Fig. III, the rod will twist somewhat due to the resistance of the first cross lug indicated by the numeral 3a. Some of the twisting will take place in the section of the elliptical rod 5 indicated by the numeral 12 and some more twisting will take place in the section indicated by the numeral 13.

Therefore almost the entire initial force applied through the handle 8 will be exerted on the first lug indicated by 3a when the adjacent section of the grid 2 breaks its connection with the tray. This will immediately cause a full transference of the twisting force to the next lug indicated by 3b, almost like a blow, and it in turn will cause its adjacent section of the grid 2 to break its connection with the tray, the same being already weakened by the action of the lug 3a.

Moisture on the outside of the tray will settle down towards the bottom and sometimes freeze the tray fast to its support and the support 20 may be provided with a groove such as 21 within which will smoothly lie another elliptical rod 5, in all respects the equivalent of those shown longitudinally of the top edges of the tray in Fig. I and provided with a handle, not shown, for the purpose of rending the ice that sticks the tray to its support.

It is thus seen that a progressive lift or pressure wave will start at 3a, next be felt at 3b, then at 3c, then at 3d and finally at 3e, so that power is not required to break the whole side loose at once although in actual operation the breaking effect may seem to be practically instantaneous. Also the resulting twisting of the grid will tend to loosen the cubes in their compartments.

A modification of this device is shown in Figs. IV, V and VI in which the elliptical rod 5 is placed across the end of the tray, being provided as before with a suitable groove in which it normally lies and being provided with a handle such as 10 that would normally be spaced intermediate the longitudinal divisional ribs of the grid 2 as shown in Fig. IV.

In this case the handle such as 10 may be curved as shown in Fig. V to provide a convenient hand hold for withdrawing the tray from the refrigerator.

In Figs. VII and VIII is shown a construction whereby a round rod has locally flattened areas such as 15 and 16 that are spaced to register with the lugs such as 3x. This construction is shown in the interests of economical manufacture since it obviates the necessity of rolling a special section such as shown in the other views.

It will thus be seen that I have here a breaking device that is free from complications, powerful, easily kept clean and well adapted to progressively accomplish a difficult function, that is breaking the ice cube grid free from the tray in such a way as to put no undue strain upon the tray or any other part of the apparatus.

Having thus fully described my invention, what I claim as new and desire to secure by Letters Patent is,—

1. In a device of the character described an ice tray, a groove formed in a top edge of the tray that is adapted to contain an elliptical torsion rod, spaced grid lugs overhanging and immediately adjacent the groove, an elliptical section torsion rod in the groove and means for twisting the torsion rod.

2. In a device for breaking adhesion of a grid within an ice tray, a groove parallel with and immediately adjacent an edge of the tray, an elliptical torsion rod member adapted to lie in said groove, grid lugs spaced to lie immediately above the said elliptical torsion rod member and means for partially turning the torsion rod member.

3. An ice breaker device for a refrigerator tray defined in part as a groove longitudinally of the upper edge of the tray, a grid in said tray that is provided with upstanding lugs arranged to overhang the groove, an elliptical breaker rod in said groove and means for twisting the said rod for applying lifting force to said lugs.

4. In an ice breaking device for a refrigerator tray, a tray member, a longitudinal groove adjacent the top of the tray and formed as part of a lip therefor, a grid member adapted to lay in the tray, lugs on the said grid formed to closely overhang the said groove, an elliptical rod adapted to lie in said groove and means for partially revolving said rod to progressively exert pressure between the groove and the lugs.

5. In a lifting device adapted to progressively lift a device with respect to another device, a groove in one device that is adapted to closely contain an elliptical torsion rod, a series of spaced lugs adapted to overlay the said groove and closely embrace a contained rod therein, a twistable elliptical torsion rod in said groove and means for turning said torsion rod to progressively apply force to the series of spaced lugs.

6. In a lifting device for breaking adhesion of frost joined surfaces, a channel to accommodate a twistable elliptical rod that is disposed between said surfaces, a twistable elliptical rod in said channel and means for twisting the rod.

7. In a device for applying rending force between two surfaces that are frozen together, a groove depressed in the plane of one of said surfaces that is adapted to contain an elliptical rod, a torsion rod of elliptical cross-section in said groove and means for manually revolving the said elliptical torsion rod.

8. In a device for breaking a grid from an ice tray, an ice tray, an outstanding edge near the top of said tray, grid lugs overhanging the edge and spaced therefrom, an elliptical section torsion rod in said space and means for twisting said torsion rod.

9. In an ice breaking device, a twistable elliptical torsion rod, a series of bearings between which said torsion rod is applied and means for manually applying twist at one end of said torsion rod whereby force is applied successively to the several bearings of said series.

10. In a device for rending two surfaces frozen together, a series of spaced two-part bearings, one part being made rigid with one surface and the other part rigid with the other surface, a twistable torsion rod adapted to be contained between said bearings and means for applying twist at one end of said torsion rod to progressively apply rending force between the said series of bearings.

11. In combination, an open end freezing chamber of a refrigerating apparatus and a tray resting upon the bottom wall thereof, said wall having a depression, and a member occupying said depression and having an operating part extending therefrom by which said member may be actuated, said depression and said member being of such cross section that a rocking movement of the latter will cause a lifting of the tray to loosen it from the bottom wall of the chamber in case it is frozen thereto.

12. In combination, a freezing chamber of a refrigerating apparatus and a tray resting upon the bottom wall thereof, said wall having a depression, and a member occupying said depression and having an operating part extending therefrom by which said member may be actuated, said depression and said member being of such form that a rocking movement of the latter will cause a lifting of the tray to loosen it from the bottom wall of the chamber in case it is frozen thereto.

LESTER E. STIPE.